United States Patent
Saito et al.

(10) Patent No.: US 8,395,976 B2
(45) Date of Patent: Mar. 12, 2013

(54) OPTICAL DISC APPARATUS, POSITION CONTROL METHOD AND OPTICAL PICKUP

(75) Inventors: Kimihiro Saito, Saitama (JP); Hirotaka Miyamoto, Kanagawa (JP); Toshihiro Horigome, Kanagawa (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 12/272,179

(22) Filed: Nov. 17, 2008

(65) Prior Publication Data

US 2009/0147660 A1 Jun. 11, 2009

(30) Foreign Application Priority Data

Dec. 6, 2007 (JP) ................. 2007-315938

(51) Int. Cl.
*G11B 7/00* (2006.01)
(52) U.S. Cl. ................................... 369/44.29
(58) Field of Classification Search .......... None
See application file for complete search history.

(56) References Cited

U.S. PATENT DOCUMENTS

| | | | |
|---|---|---|---|
| 6,711,110 B2* | 3/2004 | Wierenga | 369/53.22 |
| 2003/0133391 A1* | 7/2003 | Holtslag et al. | 369/94 |
| 2008/0316902 A1 | 12/2008 | Saito et al. | |

FOREIGN PATENT DOCUMENTS

| | | |
|---|---|---|
| JP | 2007-220206 | 8/2007 |
| JP | 2007-287245 | 11/2007 |
| WO | WO 2007/094456 A1 | 8/2007 |

OTHER PUBLICATIONS

U.S. Appl. No. 12/362,927, filed Jan. 30, 2009, Miyamoto, et al.
U.S. Appl. No. 12/441,147, filed Mar. 13, 2009, Saito, et al.

* cited by examiner

*Primary Examiner* — Joseph Haley
*Assistant Examiner* — Emily Frank
(74) *Attorney, Agent, or Firm* — Oblon, Spivak, McClelland, Maier & Neustadt, L.L.P.

(57) ABSTRACT

An optical disc apparatus can make the focus of an information light beam converged by an objective lens agree with a target track of a target mark layer of an optical disc by appropriately predefining the distance between the focus of a servo light beam and that of the information light beam with regard to the direction of the thickness and a radial direction of the optical disc by means of the optical pickup of the apparatus and then operating for focus control and tracking control of the objective lens so as to make focus of the servo light beam converged by the objective lens agree with a reference track of a reference mark layer.

7 Claims, 7 Drawing Sheets

OPTICAL DISC APPARATUS, POSITION CONTROL METHOD AND OPTICAL PICKUP

CROSS REFERENCES TO RELATED APPLICATIONS

The present invention contains subject matter related to Japanese Patent Application JP2007-315938 filed in the Japanese Patent Office on Dec. 6, 2007, the entire contents of which being incorporated herein by reference.

BACKGROUND OF THE INVENTION

1. Field of the Invention

The present invention relates to an optical disc apparatus, a position control method and an optical pickup. The present invention provides a technique that can suitably be applied to an optical disc apparatus for recording information on a plurality of layers of an optical disc.

2. Description of the Related Art

Known popular optical disc apparatus are mostly designed to irradiate a light beam on an optical disc such as a compact disc (CD), a digital versatile disc (DVD) or a Blu-ray disc (registered trademark, to be referred to as "BD" hereinafter) and reproduce information by reading the reflected light beam.

Such known popular optical disc apparatus are also designed to record information on an optical disc by irradiating a light beam onto the optical disc and changing the local reflectance or the like of the optical disc.

As for such optical discs, it is known that the size of the light spot to be formed on the optical disc is defined approximately by $\lambda/NA$ ($\lambda$: wavelength of light beam, NA: numerical aperture) and the resolution is proportional to the size of the light spot. For instance, with the BD system, about 25 GB of data can be recorded on an optical disc having a diameter of 120 mm.

Meanwhile, various pieces of information are recorded on optical discs. Information that can be recorded on optical discs includes audio contents, video contents and various computer data. Particularly, the quantity of information to be recorded on an optical disc has rapidly grown because of an increasing demand for high definition images and high quality sounds and the increased number of sets of contents to be recorded on an optical disc so that optical discs are by turn required to have a large recording capacity.

To meet the demand, optical disc apparatus adapted to record information on an optical disc, forming a plurality of recording mark layers laid one on the other in a uniform recording layer of the optical disc, have been proposed to realize a large recording capacity of optical disc (refer to, e.g. Jpn. Pat. Appln. Laid-Open Publication No. 2007-220206 (FIGS. 1, 4, and 5)).

The inside of the recording layer of such an optical disc that matches an optical disc apparatus of the above-described type is uniform. In other words, nothing that provides positional indexes exists in the recording layer. For this reason, optical disc apparatus of the type under consideration are generally adapted to form an independent servo layer where tracks are formed and then form recording marks at desired positions in the recording layer, using the servo layer as reference in the direction of the thickness of the optical disc.

For example, an optical disc apparatus 1 as shown in FIG. 1 is adapted to record information on and reproduce information from an optical disc 2 having a recording layer 2A for forming recording marks and a servo layer 2B where tracks are formed.

The optical disc apparatus 1 transmits a servo light beam L1 by means of a beam splitter 3 and focuses the servo light beam L1 to the servo layer 2B by means of an objective lens 4. Then, the optical disc apparatus 1 receives the reflected light beam L2R of the light beam Li reflected by the servo layer 2B and operates for focus control and tracking control of the objective lens 4 according to the outcome of the reception of the light beam.

Additionally, the optical disc apparatus 1 adjusts the angle of divergence of the light beam L2 by means of a relay lens 5 and causes the light beam L2 to enter the beam splitter 3 in order to record or reproduce information. The relay lens 5 includes a movable lens 6 that can be moved along the optical axis of the light beam L2 and a fixed lens 7 and the angle of divergence or convergence of the light beam L2 is adjusted by moving the lens 6.

Subsequently, the optical disc apparatus 1 reflects the light beam L2 by means of the beam splitter 3 and focuses the light beam L2 in the inside of the recording layer 2A of the optical disc 2 by means of the objective lens 4. As a result, the optical disc apparatus 1 can form a recording mark at the position of the focus F2 in the recording layer 2A of the optical disc 2.

In this way, the optical disc apparatus 1 is adapted to adjust the position of the focus F2 in the recording layer 2 according to the outcome of position control of the lens 6 of the relay lens 5.

SUMMARY OF THE INVENTION

Meanwhile, the optical disc apparatus 1 changes the position of the focused light beam L2, or the position of the focus F2, according to the angle of divergence that is observed when the light beam L2 is emitted from the relay lens 5. Therefore, the positional accuracy of the focus F2 that the optical disc apparatus 1 produces relies on the accuracy of position control of the lens 6 of the relay lens 5.

Thus, when the accuracy of position control of the lens 6 of the relay lens 5 of the optical disc apparatus 1 is low, there arises a problem of reducing the accuracy of position control of the focus F2.

In view of the above-identified problem of the conventional art, it is desirable to provide an optical disc apparatus, a position control method and an optical pickup that provide an improved level of accuracy of position control when forming a plurality of layers of recording marks one on the other in an optical disc.

In an aspect of the present invention, there is provided an optical disc apparatus including: an objective lens that converges an information light beam for recording information on or reproducing information from an optical disc where a mark layer is to be formed or two or more than two mark layers are to be formed one on the other with a plurality of recording marks representing information and arranged in a planar arrangement and also a servo light beam for determining the position of irradiation of the information light beam; an optical path forming section that forms the optical path of the information light beam and that of the servo light beam entering the objective lens so as to separate the focus of the servo light beam produced by the objective lens from the focus of the information light beam also produced by the objective lens by a predetermined distance in the layering direction with regard to the direction of the optical axis of the information light beam; a light receiving section that receives the servo reflected light beam produced as the servo light beam is reflected by the optical disc; and a position control section that controls the position of the objective lens so as to focus the servo light beam on a formed mark layer according to the outcome of receiving the servo reflected light beam.

Thus, the optical disc apparatus according to another aspect of the present invention can form a recording mark at a position separated by a predetermined distance in the layering direction from a formed mark layer in a uniform optical disc by controlling the position of the objective lens and focusing the servo light beam on the formed mark layer.

In another aspect of the present invention, there is provided a position control method including: an entering step of entering an information light beam for recording information on or reproducing information from an optical disc where a mark layer is to be formed or two or more than two mark layers are to be formed one on the other with a plurality of recording marks representing information and arranged in a planar arrangement and also a servo light beam for determining the position of irradiation of the information light beam into an objective lens so as to separate the focus of the servo light beam to be converged by the objective lens from the focus of the information light beam also to be converged by the objective lens by a predetermined distance in the layering direction with regard to the direction of the optical axis of the information light beam; a converging step of converging the information light beam and the servo light beam by means of the objective lens; a light receiving step of receiving the servo reflected light beam produced as the servo light beam is reflected by the optical disc; and a position control step of controlling the position of the objective lens so as to focus the servo light beam on a formed mark layer according to the outcome of receiving the servo reflected light beam.

Thus, the position control method according to another aspect of the present invention can form a recording mark at a position separated by a predetermined distance in the layering direction from a formed mark layer in a uniform optical disc by controlling the position of the objective lens and focusing the servo light beam on the formed mark layer.

In a further aspect of the present invention, there is provided an optical pickup including: an objective lens that converges an information light beam for recording information on or reproducing information from an optical disc where a mark layer is to be formed or two or more than two mark layers are to be formed one on the other with a plurality of recording marks representing information and arranged in a planar arrangement and also a servo light beam for determining the position of irradiation of the information light beam; an optical path forming section that forms the optical path of the information light beam and that of the servo light beam entering the objective lens so as to separate the focus of the servo light beam produced by the objective lens from the focus of the information light beam also produced by the objective lens by a predetermined distance in the layering direction with regard to the direction of the optical axis of the information light beam; and a light receiving section that receives the servo reflected light beam produced as the servo light beam is reflected by the optical disc and causes a predetermined position control section to control the position of the objective lens so as to focus the servo light beam on a formed mark layer according to the outcome of receiving the servo reflected light beam.

Thus, the optical pickup according to another aspect of the present invention can form a recording mark at a position separated by a predetermined distance in the layering direction from a formed mark layer in a uniform optical disc by causing a predetermined position control section to control the position of the objective lens and focus the servo light beam on the formed mark layer.

According to the present invention, a recording mark can be formed at a position separated by a predetermined distance in the layering direction from a formed mark layer in a uniform optical disc by controlling the position of the objective lens so as to focus the servo light beam in the formed mark layer. Thus, the present invention can realize an optical disc apparatus and a position control method that provide an improved level of control accuracy when forming a plurality of layers of recording marks one on the other in an optical disc.

Additionally, the present invention can realize an optical pickup that can form a recording mark at a position separated by a predetermined distance in the layering direction from a formed mark layer in a uniform optical disc by causing a predetermined position control section to control the position of the objective lens and focus the servo light beam on the formed mark layer so as to provide an improved level of position accuracy when forming a plurality of layers of recording marks one on the other in an optical disc.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Figure 2A:
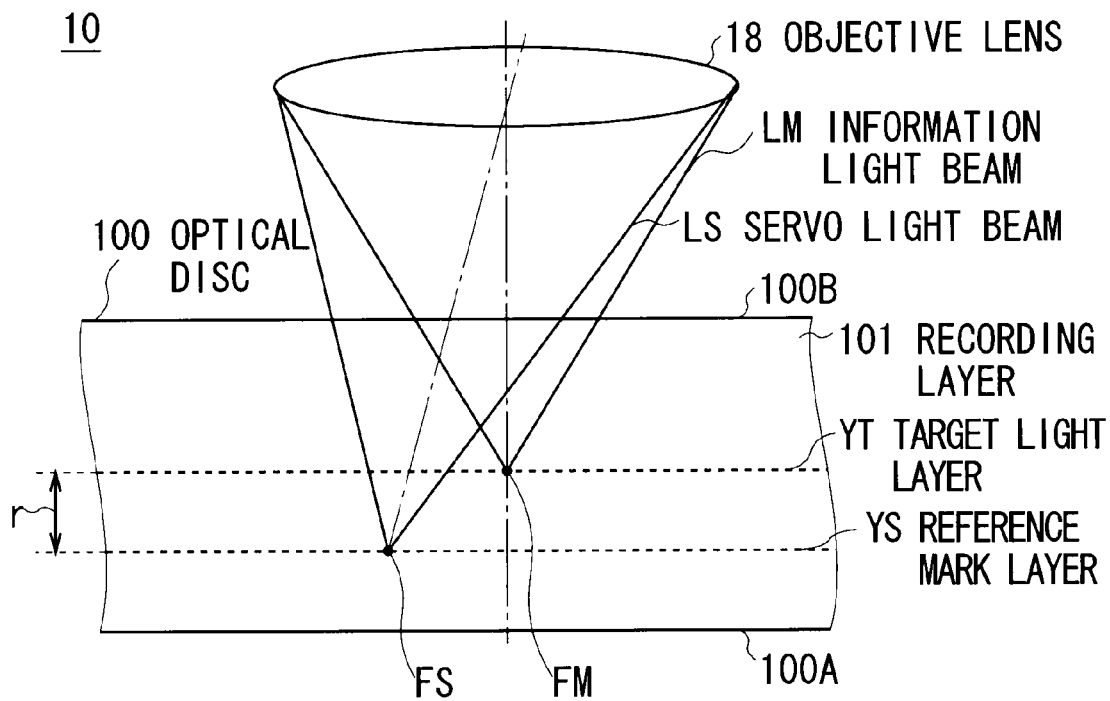
FIGS. 2A and 2B are schematic diagrams illustrating focusing (1) of an information light beam and a servo light beam.

Now, a preferred embodiment of the present invention will be described in greater detail by referring to the accompanying drawings.
(1) Basic Principle of Controlling the Focus Position
(1-1) Relationship between Information Light Beam and Servo Light Beam Firstly, the basic principle of focus position control according to the embodiment of the present invention will be described. As shown in FIG. 2A, information is recorded on an optical disc 100 by irradiating an information light beam LM from an optical disc apparatus 10 onto the optical disc 100 and read out from the optical disc 100 by detecting the information reflected light beam LM that is the information light beam LM reflected by the optical disc 100.

More specifically, the optical disc apparatus 10 converges the information light beam LM to the inside of the recording layer 101 of the optical disc 100 by means of an objective lens 18 and forms a recording mark RM on the focus FM or reflects the information light beam LM at the recording mark RM formed at the focus.

Note that the recording layer 101 is typically formed by photopolymerization type photopolymer and monomers are uniformly dispersed in the inside thereof. As the recording layer 101 is irradiated with light, monomers are polymerized (photopolymerized) at the irradiated spot to become polymers to consequently change the refractive index of the spot. Additionally, as the recording layer 101 is irradiated with light, the recording layer 101 may operate for optical cross-linking of "cross-linking" polymers and consequently raises the molecular weight to further change the refractive index. A spot where the refractive index is changed becomes a recording mark RM.

Alternatively, the recording layer 101 may be such that a resin material is mixed with a predetermined photopolymerization initiator and hardened and subsequently, as an information light beam LM is converged, the temperature of the recording layer 101 rises rapidly at and around the focus so that the photopolymerization initiator residue is gasified to produce gas bubbles at and around the focus. With such an arrangement, the produced void becomes a recording mark RM.

The optical disc apparatus 10 is designed to spirally and sequentially form a plurality of recording marks RM in the recording layer 101 of an optical disc 100 by driving the optical disc 100 to rotate and modulating the intensity of the information light beam LM, while appropriately moving the object lens 18 under control. The recording marks RM formed in this way are arranged on a plane running in parallel with the disc surface of the optical disc 100. The layer formed by the recording marks RM is referred to as mark layer Y hereinafter.

The optical disc apparatus 10 can form a plurality of mark layers Y in the recording layer 101 by changing the position of the focus FM of the information light beam LM in the direction of the thickness of the optical disc 100. The optical disc apparatus 10 may be designed to form mark layers Y sequentially from one of the surfaces, or the surface 100A, of the optical disc 100 at layer intervals of r.

In other words, the recording layer 101 is formed uniformly and does not show a multilayer structure unlike conventional DVD mediums and BD mediums. Differently stated, nothing that operates as positioning indexes for multilayer recording is provided in the recording layer 101.

Assume that a mark layer Y (to be referred to as reference mark layer YS hereinafter) is already formed in the optical disc 100 and recording marks RM are recorded in the optical disc 100 to form the next mark layer Y that is located closer to the other surface 100B than the reference mark layer YS (to be referred to as target mark layer YT hereinafter) by means of the optical disc apparatus 10.

The optical disc apparatus 10 according to the embodiment of present invention is designed to converge the servo light beam LS to the inside of the recording layer 101 of the optical disc 100 by means of the objective lens 18 in addition to the information light beam LM. The servo light beam LS is made to enter the objective lens 18 by way of an optical path that is different from the optical path of the information light beam LM and the focus FS of the servo light beam LS converged by the objective lens 18 is differentiated from the focus FM of the information light beam LM.

The focus FS of the servo light beam LS is separated from the focus FM of the information light beam LM by the layer interval r in the direction of the thickness of the optical disc 100 also inwardly by the width of a predetermined number of tracks (e.g., two tracks) in a radial direction by appropriately adjusting the optical path, the divergence angle and so on of the information light beam LM and those of the servo light beam LS by means of the optical pickup 17.

Note that the optical disc apparatus 10 is designed to prevent any interference of the light beams from taking place by forming the focus FS of the servo light beam LS inwardly relative to the focus FM of the information light beam LM and separating them by the width of two tracks and also adapted to the spiral tracks of the optical disc 100 extending from the inner peripheral side.

The servo light beam LS becomes servo reflected light beam LSR as the servo light beam LS is reflected by a recording mark RM in the reference mark layer YS.

The optical disc apparatus 10 focuses the servo light beam LS on a desired track of the reference mark layer YS (to be referred to as reference track TS hereinafter) by receiving the servo reflected light beam LSR and finely adjusting the position of the objective lens 18 according to the outcome of receiving the servo reflected light beam LSR.

In other words, the optical disc apparatus 10 controls the position of the objective lens 18 by way of so-called focus control and tracking control according to the servo reflected light beam LSR.

Thus, the optical disc apparatus 10 can focus the information light beam LM on the target track TT that is displaced inwardly by the width of two track from the reference track TS in the target mark layer YT that is separated toward the other surface 100B by the layer interval r from the reference mark layer YS according to the position relationship of the focus FM of the information light beam LM and the focus FS of the servo light beam LS.

As a result, the optical disc apparatus 10 can record the recording mark RM on the target track TT of the target mark layer YT.

Note that the optical disc apparatus 10 is designed to focus the information light beam LM on the target track TT of the target mark layer YT by focusing the servo light beam LS on the reference track TS of the reference mark layer YS in the case of reading out the recording mark RM in the target mark layer YT and reproducing information as in the case of forming a recording mark RM on the target mark layer YT (or in the case of recording information).

In short, the optical disc apparatus 10 is designed to control the position of the objective lens 18 to focus the information light beam LM on the target track at the target position TP by focusing the servo light beam LS on the reference track TS that is located inwardly relative to the target track and separated from the target track by the width of two tracks in the reference mark layer YS that is separated from the target mark layer YT by the height of a layer.

(1-2) Irradiation of Servo Light Beam

Figure 2B:
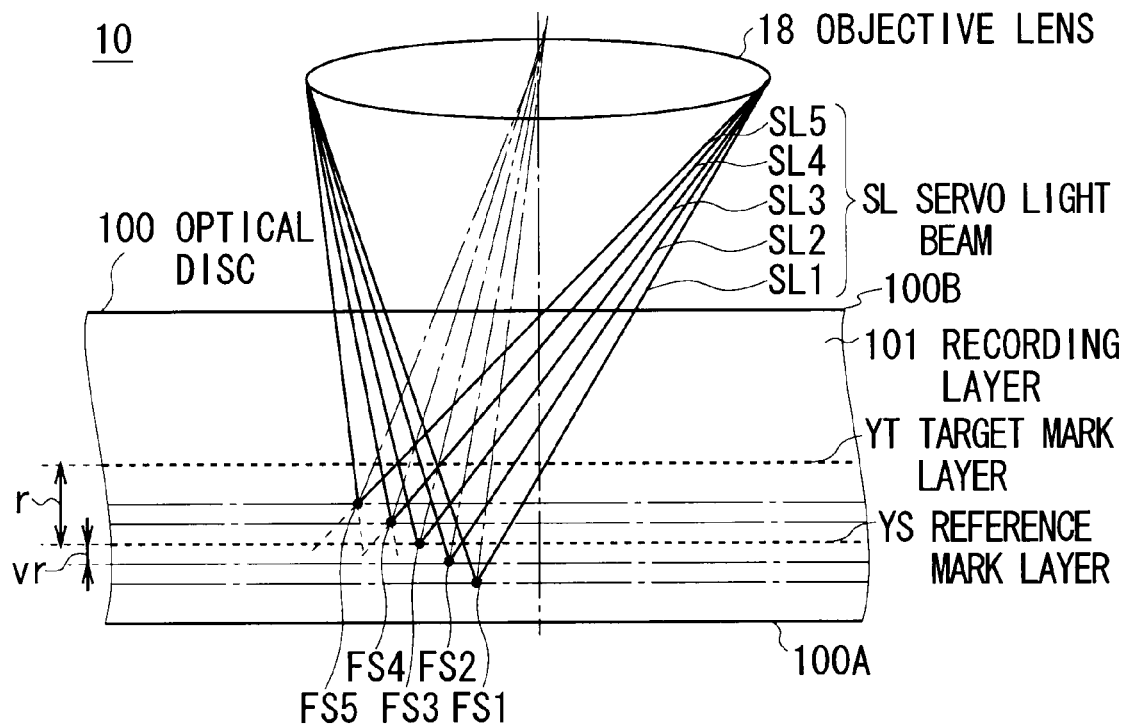

In actuality, the optical disc apparatus 10 is designed to irradiate five servo light beams LS1, LS2, LS3, LS4 and LS5 (to be referred to simply as LS1 through LS5 hereinafter) on the optical disc 100 as shown in FIG. 2B.

Additionally, the optical disc apparatus 10 is designed to differentiate the positions of the focuses FS1, FS2, FS3, FS4 and FS5 (to be referred to simply as FS1 through FS5 hereinafter) of the servo light beams LS1 through LS5 by adjusting the optical paths of the servo light beams LS1 through LS5 before they are made to enter the objective lens 18.

More specifically, the optical disc apparatus 100 separates the focuses FS1 through FS5 from each other by a distance of vr in the direction of the thickness of the optical disc 100 and positions the focus FS3 in the reference mark layer YS. Note that a value sufficiently smaller than the layer interval r is selected for the distance vr.

In other words, the optical disc apparatus 100 focuses the servo light beam LS3 in the reference mark layer YS and defocuses the servo light beams LS2 and LS4 at respective positions separated from the reference mark layer YS by the distance of vr in opposite directions, while the optical disc apparatus 100 defocuses the servo light beams LS1 and LS5 at respective positions separated from the reference mark layer YS by the distance of 2vr in opposite directions.

Additionally, the focus FS3 of the servo light beam LS3 is located at a position separated inwardly from the focus FM of the information light beam LM by the width of a predetermined number of tracks (e.g., three tracks) on the disc surface of the optical disc 100 or in the tracking direction.

Figure 3:
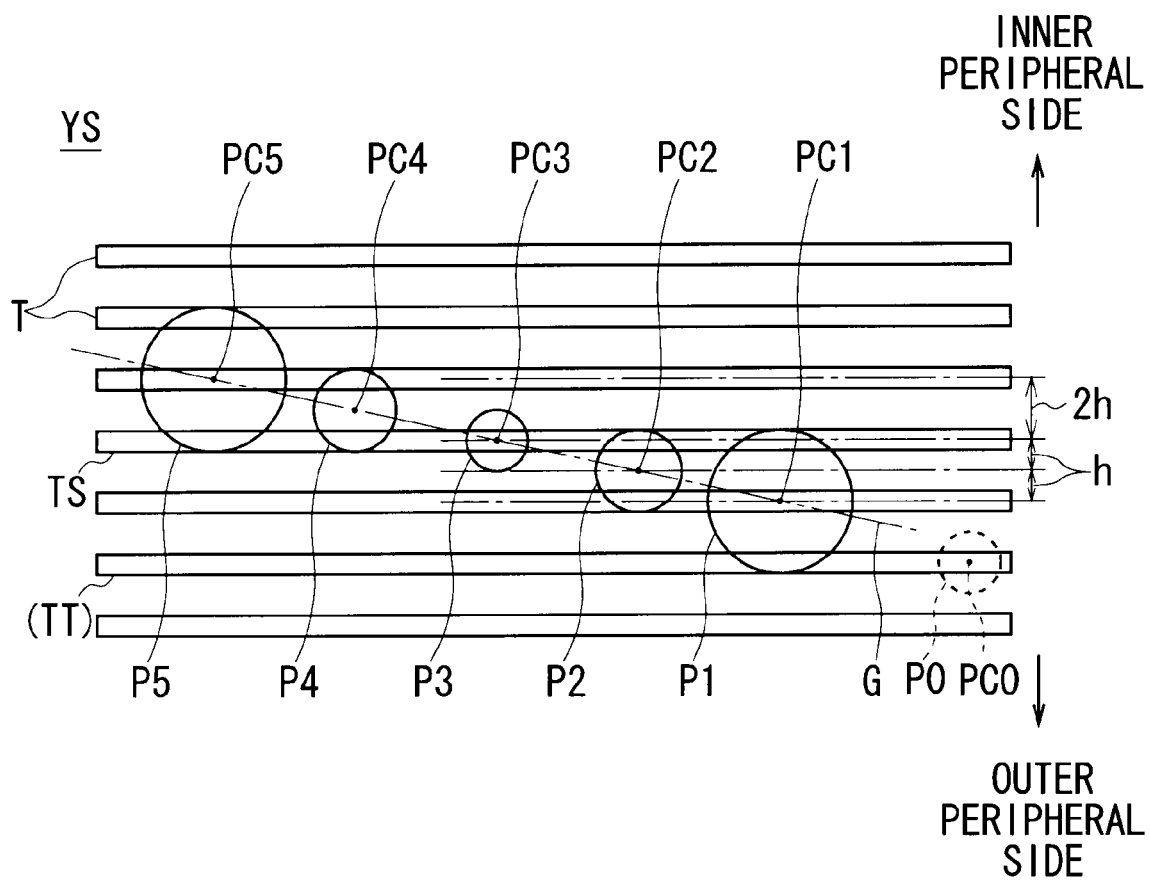
FIG. 3 is a schematic diagram showing beam spots formed in a mark layer.

FIG. 3 shows how spots P1 through P5 are formed in the reference mark layer YS by the servo light beams LS1 through LS5. Note that, in FIG. 3, the recording marks RM arranged spirally and successively in the reference mark layer YS is indicated as tracks T.

As shown in FIGS. 2A and 2B, the optical disc apparatus 10 focuses the servo light beam LS3 in the reference mark layer YS. To do this, the optical disc apparatus 10 converges the servo light beam LS3 to form a relatively small beam spot P3 in the reference mark layer YS as shown in FIG. 3.

On the other hand, as shown in FIGS. 2A and 2B, the optical disc apparatus 10 separates the focuses FS2 and the FS4 from the reference mark layer YS by the distance of vr in opposite directions. Thus, the optical disc apparatus 10 forms beam spots P2 and P4 in the reference mark layer YS, both of which are slightly larger than the beam spot P3, respectively by the servo light beams LS2 and LS4.

Additionally, as shown in FIGS. 2A and 2B, the optical disc apparatus 10 separates the focuses FS1 and FS5 from the reference mark layer YS by the distance of 2vr in opposite directions. Thus, the optical disc apparatus 10 forms beam spots P1 and P5 in the reference mark layer YS, both of which are considerably larger than the beam spot P3, respectively by the servo light beams LS1 and LS5.

Still additionally, as shown in FIG. 3, the optical disc apparatus 10 converges the beam spots P1, P2, P3, P4 and P5 (to be referred to simply as P1 through P5 hereinafter) so as to put the spot centers PC1, PC2, PC3, PC4 and PC5 (to be referred to simply as PC1 through PC5 hereinafter) of the respective beam spots on a virtual straight line G.

At this time, the optical disc apparatus 10 separates the spot centers PC2 and PC4 from the spot center PC3 by a distance h of a half of a track in opposite directions orthogonal relative to the tracks T and also separates the spot centers PC1 and PC5 from the spot center PC3 by a distance 2h of a track in opposite directions also orthogonal relative to the tracks T.

In other words, the optical disc apparatus 10 converges the servo light beams LS1 through LS5 in and near the recording reference mark layer YS by means of a technique similar to the general three beam method for tracking control of CDs and DVDs.

At this time, as the servo light beams LS1 through LS5 are reflected by the recording reference mark layer YS, they become respectively servo reflected light beams LSR1, LSR2, LSR3, LSR4 and LSR5 (to be referred to simply as LSR1 through LSR5 hereinafter).

The optical disc apparatus 10 receives the servo reflected light beams LSR1 through LSR5 that are produced in this way and control the position of the objective lens 18 according to the outcome of receiving the reflected light beams.

At this time, the optical disc apparatus 10 can put the spot center PC0 of the spot P0 formed by the information light beam LM in the target mark layer YT on the target track TT by putting the spot center PC3 exactly on the reference track TS in the reference mark layer YS.

Figure 4A:
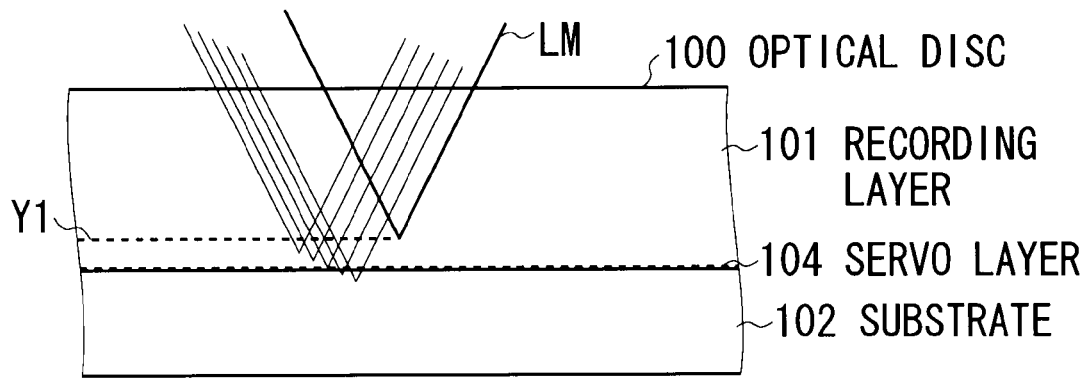
FIGS. 4A and 4B are schematic diagrams illustrating focusing (2) of an information light beam and a servo light beam.
Figure 4B:
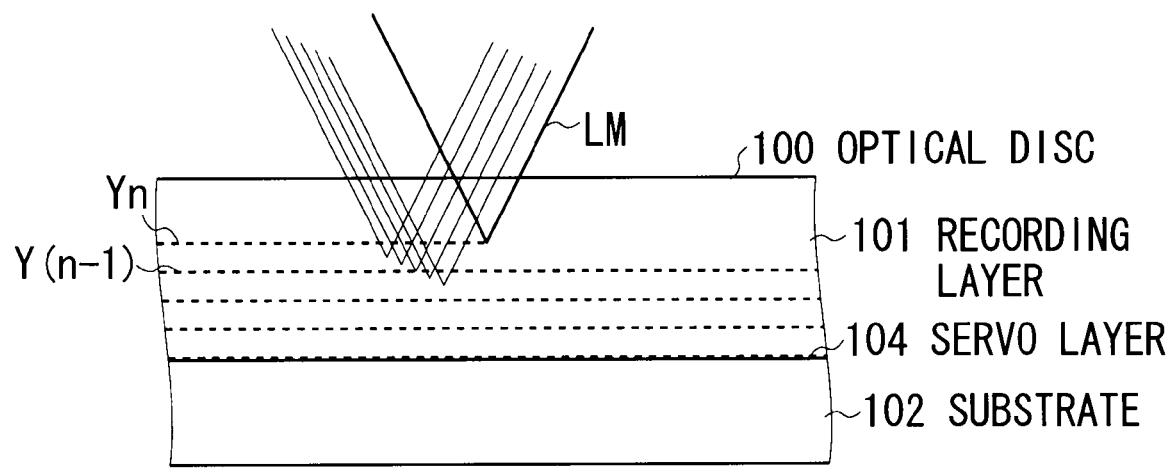

Besides, a servo layer 104 is formed at the side of the surface 100A of the recording layer 101 as shown in FIG. 4A. Tracks are formed in the servo layer 104 by means of pits and grooves that indicate addresses on the disc surface of the optical disc 100. In other words, the servo layer 104 indicates positions in a mark layer Y by means of the tracks.

Note that a substrate 102 is arranged at the side of the surface 100A of the servo layer 104 in actuality as shown in FIG. 4A. The substrate 102 is made of a relatively strong resin material and takes a role of maintaining the strength of the optical disc 100 and protecting the recording layer 101 from the side of the surface 100A.

When recording information on the optical disc 100, more particularly, when recording recording marks RM, using the first mark layer Y1 located closest to the surface 100A in the recording layer 101 as target mark layer YT, the optical disc apparatus 10 focuses the servo light beam LS (more specifically, the servo light beam LS3), regarding the servo layer 104 as reference mark layer YS.

As a result, the optical disc apparatus 10 can form the first mark layer Y1 at the position separated by the layer interval r from the servo layer 104 in the recording layer 101.

As the optical disc apparatus 10 subsequently selects the n-th mark layer Yn (n being an integer not smaller than 2) as target mark layer YT, the optical disc apparatus 10 focuses the servo light beam LS (more specifically, the servo light beam LS3), regarding the n−1-th mark layer Y(n−1) as reference mark layer YS.

As a result, the optical disc apparatus 10 can form the first mark layer Y1 at a position separated from the (n−1)-th mark layer Y where information is already recorded by the layer interval r in the recording layer 101.

Additionally, when reproducing information from the optical disc 100, the optical disc apparatus 10 selects the mark layer Y where the information to be reproduced is recorded as recording marks RM, as target mark layer YT and the mark layer Y formed closer to the side of the surface 100A than the target mark layer YT by a layer as reference mark layer YS.

In this way, at the time of converging the information light beam LM in the target mark layer YT, the optical disc apparatus 10 converges the information light beam LM on the target track TT of the target mark layer YT by converging the servo light beams LS1 through LS5 to the reference track TS of the reference mark layer YS formed at the side of the surface 100A relative to the target mark layer YT and its vicinity.

(2) Configuration of Optical Disc Apparatus

Now, the configuration of the optical disc apparatus 10 and that of the optical pickup 17 will be specifically described.

(2-1) Configuration of Optical Disc Apparatus

Figure 5:
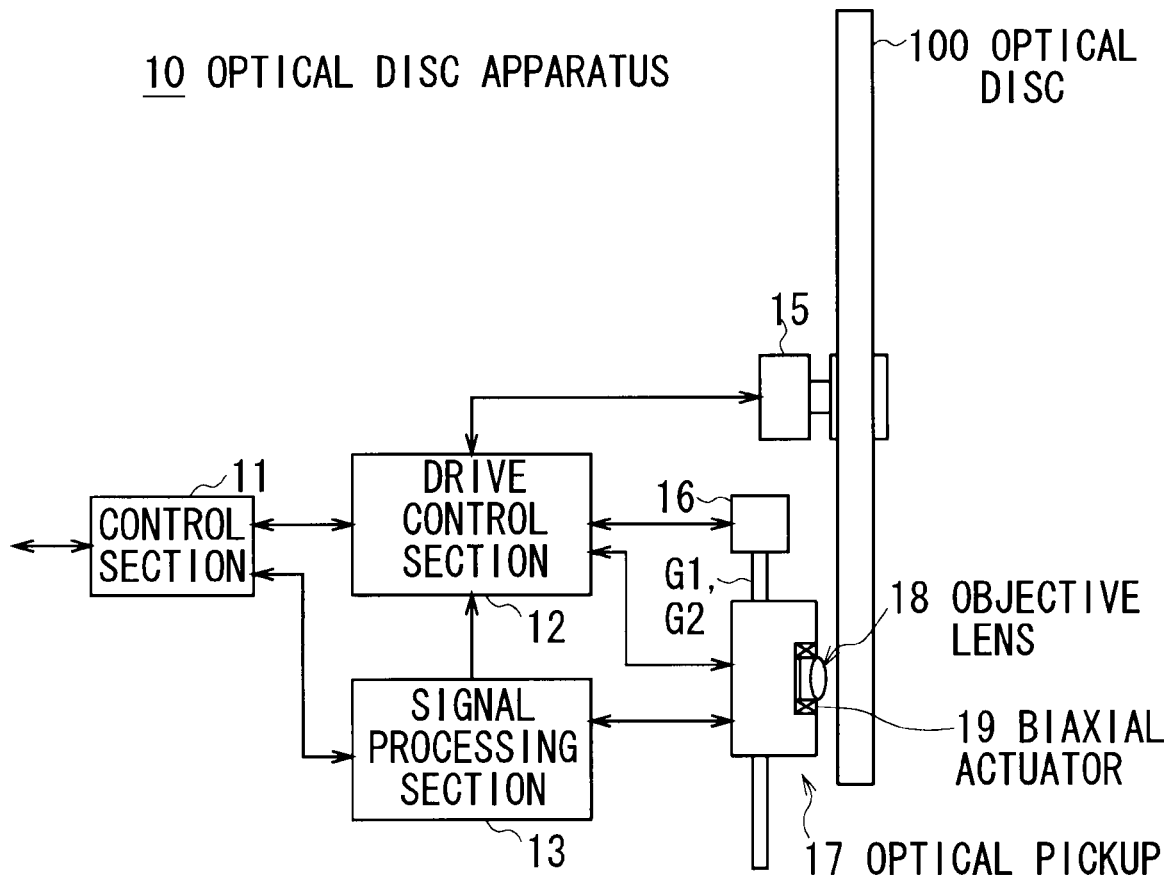
FIG. 5 is a schematic block diagram of an optical disc apparatus, showing the overall configuration thereof.

As shown in FIG. 5, the optical disc apparatus 10 is configured with a control section 11 that operates as center. Although not shown, the control section 11 includes a central process unit (CPU), a read only memory (ROM) storing various programs and a random access memory (PAM) to be used as work memory of the CPU.

When recording information on the optical disc 100, the control section 11 drives a spindle motor 15 to rotate by way of a drive control section 12 so as to drive the optical disc 100 mounted on a turntable (not shown) to rotate at a desired rate.

The control section 11 also drives the optical pickup 17 to move to a large extent in either of the tracking directions along the axes of movement G1 and G2, or toward the inner peripheral side or the outer peripheral side of the optical disc 100, by driving a thread motor 16 by way of the drive control section 12.

A plurality of optical parts including the objective lens 18 is fitted to the optical pickup 17. The optical pickup 17 irradiates an information light beam LM and servo light beams LS1 through LS5 toward the optical disc 100 and detects the servo reflected light beams LSR1 through LSR5 produced as the servo light beams LS1 through LS5 are reflected by the optical disc 100 under the control of the control section 11.

Then, the optical pickup 17 generates a plurality of detection signals according to the respective outcomes of the detection of the servo reflected light beams LSR1 through LSR5 and supplies them to a signal processing section 13. The signal processing section 13 executes a predetermined arithmetic process, using the supplied detection signals, to generate a focus error signal SFE and a tracking error signal STE. The signal processing section 13 then supplies these signals to the drive control section 12.

The drive control section 12 generates a drive signal for driving the objective lens 18 according to the supplied focus error signal and tracking error signal and supplies the drive signal to the biaxial actuator 19 of the optical pickup 17.

The biaxial actuator 19 of the optical pickup 17 operates for focus control and tracking control of the objective lens 18 according to the drive signal and causes the focus FS of the servo light beam LS converged by the objective lens 18 to follow the reference track TS of the reference mark layer YS.

At this time, the control section 11 forms recording marks RM on the target track TT of the target mark layer YT by modulating the intensity of the information light beam LM by means of the signal processing section 13 according to the externally supplied information in order to record the information.

Additionally, when the optical pickup 17 reproduces information from the optical disc 100, the optical pickup 17 causes the focus FS of the servo light beam LS to follow the desired track TT of the reference mark layer YS as in the case of a recording operation and, at the same time, irradiates an information light beam LM of a relatively low constant intensity onto the target track TT of the target mark layer YT to detect the information reflected light beam LMR produced as the information light beam LM is reflected by the optical disc 100 at the spot where the target recording mark RM is formed.

Then, the optical pickup 17 generates a detection signal according to the outcome of detection of the information reflected light beam LMR and supplies the detection signal to the signal processing section 13. The signal processing section 13 reproduces the information recorded as recording marks RM on the target track TT of the target mark layer YT by executing a predetermined arithmetic process, a predetermined demodulation process and a predetermined decoding process on the detection signal.

(2-2) Configuration of Optical Pickup

Figure 6:
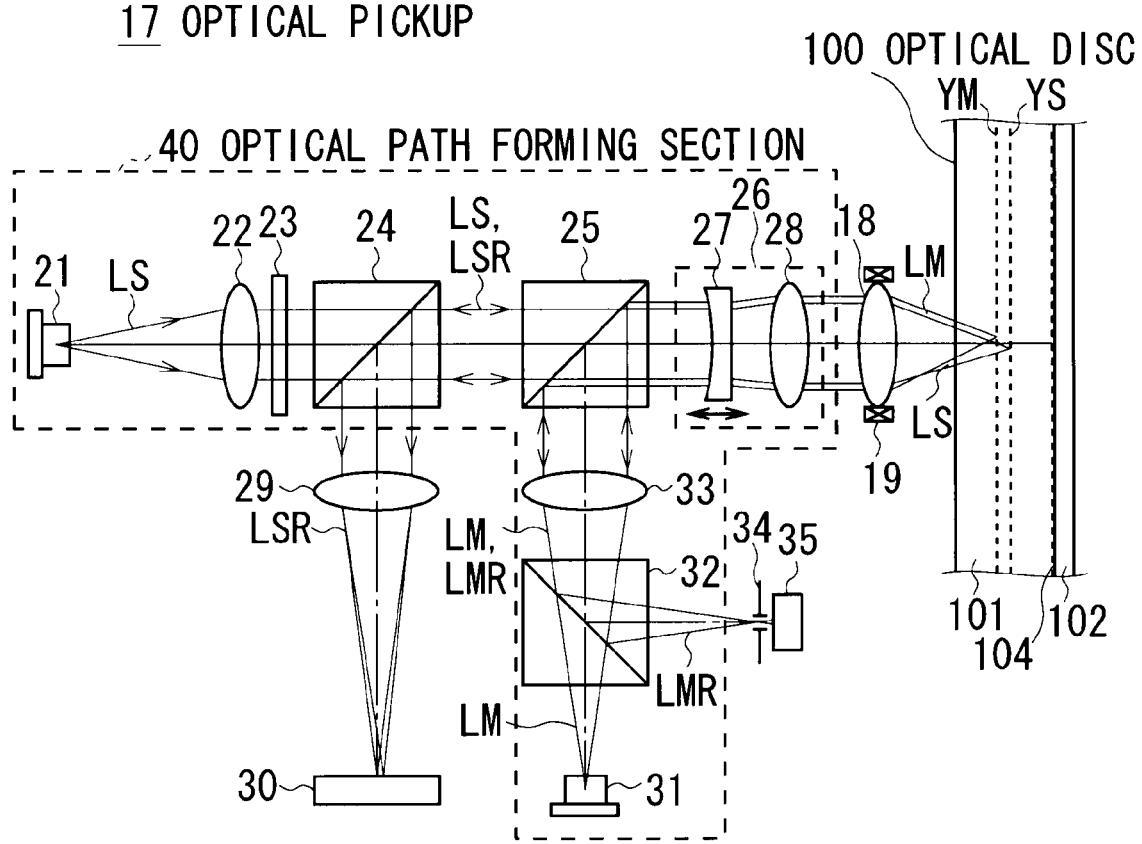
FIG. 6 is a schematic diagram of an optical pickup, showing the configuration thereof.

The optical pickup 17 has a plurality of optical parts as shown in FIG. 6. The optical parts can roughly be classified into a servo optical system for irradiating a servo light beam LS onto the optical disc 100 and detecting the servo reflected light beam LSR and an information optical system for irradiating an information light beam LM onto the optical disc 100 and detecting the information reflected light beam LMR.

Laser diode 21 typically emits a servo light beam LS that is a laser beam of a wavelength of about 405 nm, converts the servo light beam LS into a collimated light beam by means of a collimator lens 22 and subsequently makes the collimated light beam enter a hologram plate 23.

Figure 7:
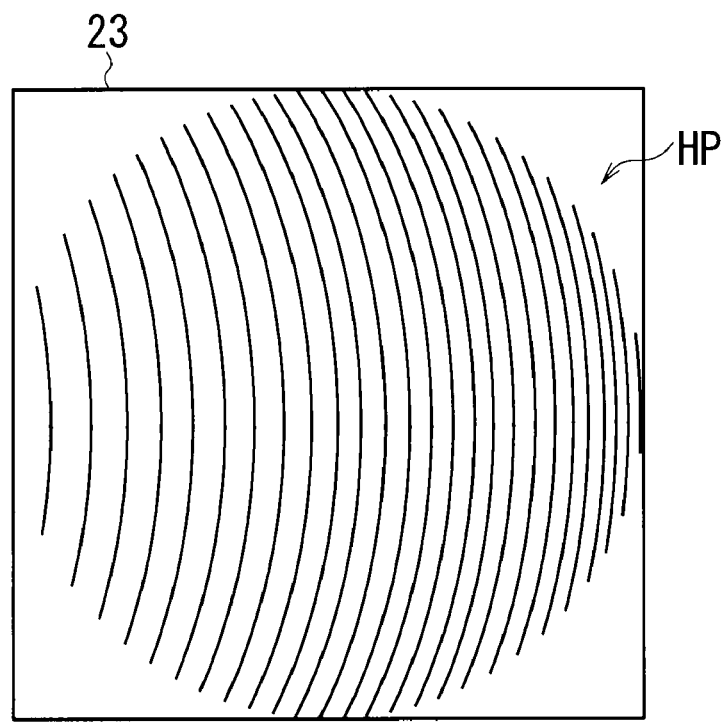
FIG. 7 is a schematic diagram of a hologram plate, showing the configuration thereof.

As shown in FIG. 7, a hologram pattern HP is formed on the surface of the hologram plate 23. The hologram plate 23 diffracts the servo light beam LS so as to cause the servo light beam LS to enter a beam splitter 24 as servo light beams LS1 through LS5 of diffracted light of the second order or a higher order.

Note that, while the servo light beams LS1 through LS5 proceed with their optical axes slightly separated from each other in the optical pickup 17, they proceeds substantially on the same optical path. Therefore, the servo light beams LS1 through LS5 are collectively handled as servo light beam LS in the following description for the purpose of simplicity. Additionally, the servo light beams LS1 through LS5 are shown as a single servo light beam LS after passing the hologram plate 23 in FIG. 6.

The beam splitter 24 causes the servo light beam LS to pass by a predetermined ratio (e.g., about 50%) and makes the servo light beam LS enter another beam splitter 25. Like the beam splitter 24, the beam splitter 25 causes the servo light beam LS to pass by a predetermined ratio (e.g., about 50%) and makes the servo light beam LS enter a relay lens 26.

The relay lens 26 is formed by a movable lens 27 that can be moved in the direction of the optical axis of the servo light beam LS and a fixed lens 28.

The movable lens 27 converges the servo light beam LS and makes the servo light beam LS enter the fixed lens 28 in a state where the servo light beam LS is converged and subsequently becomes divergent light. The fixed lens 28 narrows the angle of divergence of the servo light beam LS before the fixed lens 28 makes the servo light beam LS enter the objective lens 18.

The relay lens 26 adjusts the angle of divergence of the servo light beam LS emitted from the fixed lens 28, or the angle of divergence of the servo light beam LS entering the objective lens 18, by adjusting the position of the movable lens 27 under the control of the drive control section 12 (FIG. 5).

The objective lens 18 focuses the five servo light beams LS1 through LS5 at respective spots that are different from each other as shown in FIG. 2B. The position of the movable lens 27 of the relay lens 26 is regulated such that the focus FS3 of the servo light beam LS3 out of the five servo light beams LS1 through LS5 is made to substantially agree with the reference mark layer YS. Thus, as a result, beam spots P1 through P5 as shown in FIG. 3 are formed in the reference mark layer YS.

The servo light beams LS1 through LS5 are reflected respectively by recording marks RM of the reference mark layer YS to become servo reflected light beams LSR1 through LSR5, which then proceed their optical paths in the opposite direction while they are diffused.

Thereafter, the servo reflected light beams LSR1 through LSR5 (to be collectively referred to as servo reflected light beam LSR hereinafter) are converged by the objective lens 18 and converted into collimated light beams as they sequentially pass the relay lenses 28 and 27 before they enter the beam splitter 25.

The beam splitter 25 causes the servo reflected light beam LSR to pass by a ratio of about 50% and makes the servo reflected light beam LSR enter the beam splitter 24. The beam splitter 24 reflects the servo reflected light beam LSR by a ratio of about 50% and makes the servo reflected light beam LSR enter condenser lens 29.

Figure 8:
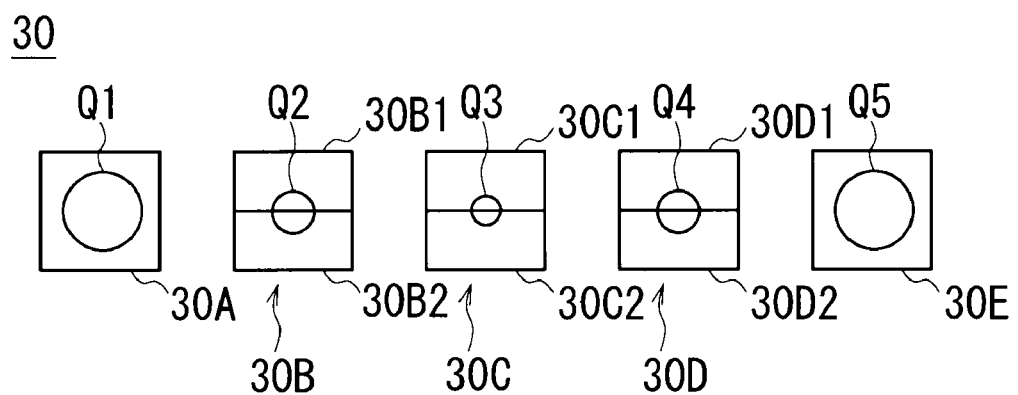
FIG. 8 is a schematic diagram of a photodetector, showing the configuration thereof.

The condenser lens 29 converges the servo reflected light beam LSR and irradiates the servo reflected light beam LSR onto the surface of the photodetector 30. The photodetector 30 has detection regions 30A, 30B, 30C, 30D and 30E (to be collectively referred to as 30A through 30E hereinafter) on the surface thereof as shown in FIG. 8.

Then, beam spots Q1 through Q5 are formed as the servo reflected light beams LSR1 through LSR5 are irradiated respectively onto the detection regions 30A through 30E of the photodetector 30.

The detection regions 30B, 30C and 30D are divided respectively into detection regions 30B1 and 30B2, 30C1 and 30C2 and 30D1 and 30D2 and adapted to detect the quantities of light of the respective beam spots Q2 through Q4. Then, they respectively generate detection signals UB1 and UB2, UC1 and UC2 and UD1 and UD2 according to the detected quantities of light of the beam spots and supply these signals to the signal processing section 13 (FIG. 5).

The detection regions 30A and 30E are adapted to respectively detect the quantities of light of the beam spots Q1 and Q2 and generate detection signals UA and UE according to the detected quantities of light of the beam spots. Then, they supply these signals to the signal processing section 13 (FIG. 5). Note that each detection signal U represents the amplitude of the high frequency component of the detected signal.

The optical pickup 17 is so designed that the states of the beam spots P1 through P5 formed on the reference mark layer YS in the recording layer 101 of the optical disc 100 are reflected to the states of the beam spots Q1 through Q5 formed on the surface of the photodetector 30 when the positional arrangement of the optical parts and the magnifications of the lenses are properly adjusted.

The signal processing section 13 (FIG. 5) generates a focus error signal SFE, using the detection signals UA and UE, according to the formula (1) shown below, on the basis of a principle similar to that of the so-called astigmatic method and supplies the focus error signal SFE to the drive control section 12:

$$SFE = UA - UE \quad (1)$$

Additionally, the signal processing section 13 generates a tracking error signal STE, using the detection signals UB1 and UB2, UC1 and UC2 and UD1 and UD2, according to the formula (2) shown below, on the basis of a principle similar to that of the so-called DPP (differential push pull) method and supplies the tracking error signal STE to the drive control section 12:

$$STE = UC1 - UC2 - k \cdot (UB1 - UB2 + UD - UD2) \quad (2)$$

The drive control section 12 generates a focus drive signal SFD and a tracking drive signal STD, by executing predetermined processes such as a phase compensation process and an amplification process on the focus error signal SFE and the tracking error signal STE and supplies the generated signals to the biaxial actuator 19 of the optical pickup 17.

The biaxial actuator 19 of the optical pickup 17 drives the objective lens 18 in the focusing direction and the tracking direction respectively according to the focus drive signal SFD and the tracking drive signal STD.

As a result, the optical pickup 17 can make the focus FS3 of the servo light beam LS3 agree with the reference mark layer YS.

Additionally, the signal processing section 13 generates an RF signal SRFS by means of the servo light beam LS3, using the detection signals UC1 and UC2 and the formula (3) shown below:

$$SRFS = UC1 + UC2 \quad (3)$$

The signal processing section 13 extracts servo address information AS that indicates the address of the position that is irradiated with the servo light beam LS3 and where the focus FS3 of the servo light beam LS3 is located by executing predetermined processes such as a decoding process on the RF signal SRFS, and supplies the information to the drive control section 12.

The drive control section 12 receives target address information AT that indicates the address of the target track TT from the control section 11 and operates for tracking control of the optical pickup 17 and the objective lens 18 by means of the thread motor 16 (FIG. 5) and the biaxial actuator 19 according to the difference between the target address information AT and the servo address information AS.

As a result, the optical pickup 17 can make the focus FM of the information light beam LM agree with the position indicated by the target address information AT and hence the target track TT.

On the other hand, the laser diode 31 emits an information light beam LM that is a laser beam of a wavelength of about 405 nm under the control of the control section 11 and makes the information light beam LM enter a beam splitter 32. Note that the laser diode 31 emits an information light beam LM of a relatively weak constant intensity at the time of reproducing information, whereas the laser diode 31 emits an information light beam LM that is modulated at a relatively strong intensity at the time of recording information according to the modulation signal that is generated as the information to be recorded is modulated by the signal processing section 13.

The beam splitter 32 makes the information light beam LM to be transmitted by a ratio of about 50% and enter a collimator lens 33. The collimator lens 33 collimates the information light beam LM and makes the collimated information light beam LM enter the beam splitter 25. The beam splitter 25 makes the information light beam LM enter the relay lens 26 after reflecting the beam LM by a ratio of about 50%.

An optical path forming section 40 slightly differentiates the optical axis, the beam diameter and the moving direction of the information light beam LM from those of the servo light beam LS but makes the information light beam LM proceed along an optical path that is substantially same as the optical path of the servo light beam LS. Thus, the information light beam LM is converged to the inside of the recording layer 101 of the optical disc 100 by way of the relay lens 26 and the objective lens 18 like the servo light beam LS.

Since the objective lens 18 is controlled for focus control and tracking control so as to focus the servo light beam LS3 on the reference track TS of the reference mark layer YS, the objective lens 18 can focus the information light beam LM on the target track TT of the target mark layer YT as shown in FIGS. 2A, 2B and 3.

As a result, the optical pickup 17 can form a recording mark RM on the target track TT of the target mark layer YT according to the modulated state of the information light beam LM when recording information.

Additionally, if a recording mark RM is formed on the target track TT of the target mark layer YT when reproducing information, the information light beam LM is reflected by the recording mark RM and the produced information reflected light beam LMR is made to enter the objective lens 18.

Like the servo reflected light beam LSR, the information reflected light beam LMR is converged by the objective lens 18 and converted into a collimated light beam as the beam LMR sequentially passes the relay lenses 28 and 27 before the beam LMR is made to enter the beam splitter 25.

The beam splitter 25 reflects the information reflected light beam LMR by a ratio of about 50% and makes the information reflected light beam LMR enter the collimator lens 33. The collimator lens 33 converts the information reflected light beam LMR from a collimated light beam into a converged light beam and makes the beam LMR enter the beam splitter 32.

The beam splitter 32 reflects the information reflected light beam LMR by a ratio of about 50% and makes the beam LMR enter a photodetector 35 by way of a slit 34.

The slit 34 is arranged in a plane that includes the focus of the information reflected light beam LMR and has a hole slightly larger than the beam diameter of the information light beam LM. Thus, the slit 34 shuts off the reflected light beams of the information light beam LM reflected by the mark layers Y other than the target mark layer YT, or any unnecessary stray light.

The photodetector 35 detects the information reflected light beam LMR and generates a detection signal URF according to the outcome of the detection. Then, the photodetector 35 supplies the detection signal URF to the signal processing section 13 (FIG. 5). Then, in response, the signal processing section 13 executes predetermined processes such as a demodulation process and a decoding process on the detection signal URF to reproduce the information.

In this way, the optical pickup 17 focuses the information light beam LM on the target track TT of the target mark layer YT by operating for focus control and tracking control of the objective lens 18 so as to focus the servo light beam LS on the reference track TS of the reference mark layer YS.

(3) Operation and Effects

With the above-described arrangement, the optical pickup 17 of the optical disc apparatus 10 causes the hologram plate 23 to diffract the servo light beam LS to produce five servo light beams LS1 through LS5 and converges the servo light beams to the inside of the recording layer 101 of the optical disc 100.

The optical disc apparatus 10 operates for focus control and tracking control of the objective lens 18 so as to focus the servo light beam LS3 on the reference track TS that is located inside relative to the target track TT and separated from the latter track by a distance of two tracks in the reference mark layer YS that is located at the side of the surface 100A relative to the target mark layer YT and separated from the latter layer by a distance of a single layer in order to consequently converge the information light beam LM by means of the objective lens 18.

At this time, the optical disc apparatus 10 separates the focus FS3 of the servo light beam LS3 from the focus FM of the information light beam LM in the direction of the thickness of the optical disc 100 by a distance of layer interval r and also in the tracking direction by a distance of two tracks by means of the optical design of the optical path forming section 40 of the optical pickup 17.

Thus, the optical disc apparatus 10 can make the focus FM of the information light beam LM agree with the target track TT of the target mark layer YT by controlling the position of the objective lens 18 so as to make the focus FS 3 of the servo light beam LS3 agree with the reference track TS of the reference mark layer YS.

With the above-described arrangement, the optical disc apparatus 10 can fix the gap between the focus FS3 of the servo light beam LS3 and the focus FM of the information light beam LM to the layer interval r in the direction of the thickness of the optical disc 100 by means of the optical design of the optical path forming section 40 of the optical pickup 17.

Particularly, the optical disc apparatus 10 can make the focus FS3 of the servo light beam LS3 accurately agree with the reference track TS of the reference mark layer YS by operating for focus control and tracking control, utilizing the five servo light beams LS1 through LS5.

Thus, if compared with an arrangement of adjusting the position of the focus FM only by controlling the position of the movable lens 27 of the relay lens 26, the optical disc apparatus 10 can maintain the layer interval r regardless of the position control accuracy of the optical disc apparatus 10.

Additionally, when the first mark layer Y1 located closest to the surface 100A in the recording layer 101 of the optical disc 100 is selected as the target mark layer YT, the optical disc apparatus 10 can make the focus FM of the information light beam LM rightly agree with the target mark layer YT for the first mark layer Y1 by regarding the servo layer 104 as reference mark layer YS and focusing the servo light beam LS3 there.

Meanwhile, when the mark layer Y is made to show a multilayer structure for recording information, the optical disc apparatus 10 repeats the operation of forming a target track TT in the mark layer Yn by referring to the reference track TS of the mark layer Y(n−1). Thus, while the optical disc apparatus 10 can form recording marks RM, highly accurately reflecting the precise tracks formed in the servo layer 104 to the recording mark forming operation for the first mark layer Y1, the positional errors of tracks can be accumulated for the second and subsequently layers.

However, on the other hand, the optical disc apparatus 10 is assumed to be required to handle only about 20 to 40 layers of an optical disc 100 due to restrictions in terms of the thickness of the optical disc 100 and the size of each recording mark RM. Therefore, when the optical disc apparatus 10 forms a recording mark RM in the mark layer Y remotest from the servo layer 104, the positional errors relative to the tracks formed on the servo layer 104 can be minimized.

Additionally, as shown in FIGS. 2B and 3, the optical disc apparatus 10 is adapted to differentiate the positions of the focuses FS1 through FS5 and cause the five servo light beams LS1 through LS5 to be reflected by the reference mark layer YS so as to receive the servo reflected light beams LSR1 through LSR5 by means of the photodetector 30.

Therefore, the optical disc apparatus 10 can operate for focus control and tracking control of the objective lens 18 with ease on the basis of a principle similar to that of the so-called astigmatic method or a DPP method.

Furthermore, if no recording mark RM is formed in the reference mark layer YS and the optical disc apparatus 10 is not able to properly operate for focusing control and tracking control of the objective lens 18, the optical disc apparatus 10 can make at least the information light beam LM approximately agree with the target mark layer YT because the focus FM3 of the servo light beam LS3 is made to approximately agree with the reference mark layer YS by the relay lens 26 so that the information light beam LM is not deviated significantly from the target mark layer YT.

With the above described arrangement, the optical disc apparatus 10 can make the focus FM of the information light beam LM that is converged by the objective lens 18 agree with the target track TT of the target mark layer YT by operating for focus control and tracking control of the objective lens 18 so as to make the servo light beam LS3 that is converged by the objective lens 18 agree with the reference track TS of the reference mark layer YS provided that the distance between the focus FS3 of the servo light beam LS3 and the focus FM of the information light beam LM is appropriately set in terms of the direction of the thickness of the optical disc 100 and also the radial direction of the optical disc 100.

(4) Other Embodiments

Figure 1:
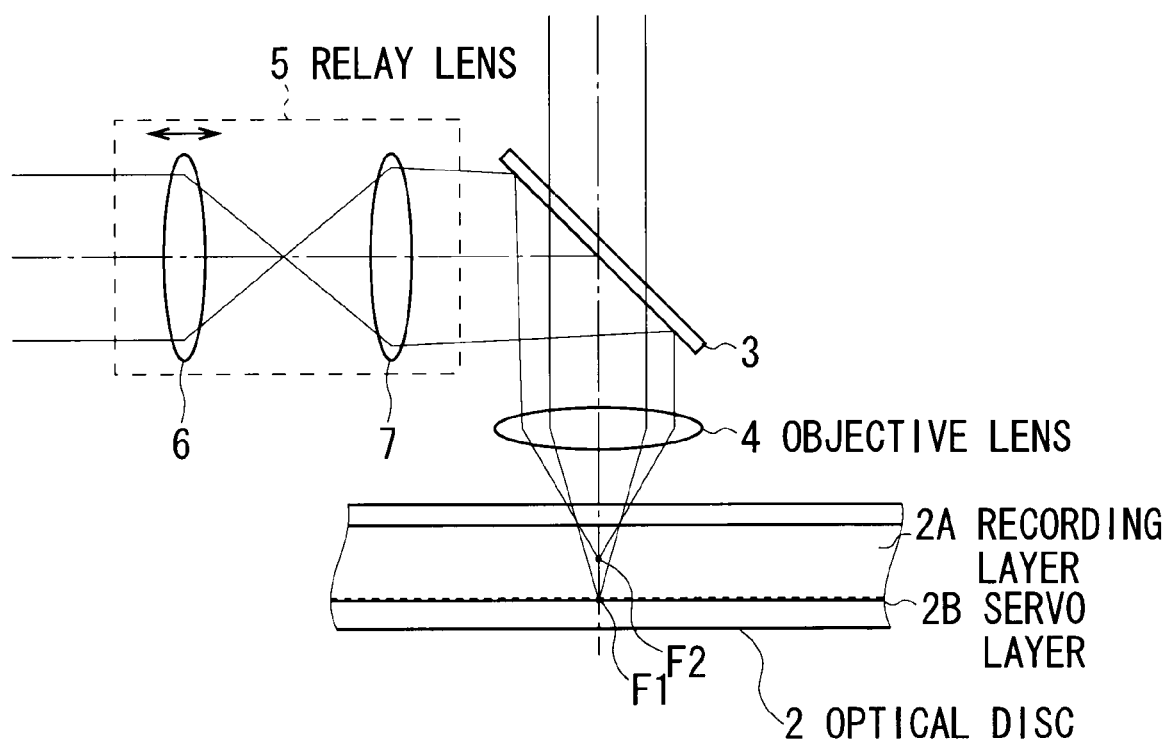
FIG. 1 is a schematic diagram of a known optical disc apparatus, showing the configuration thereof.

While the optical disc apparatus 10 is adapted to operate both for focus control and tracking control of the objective lens 18 according to the outcome of receiving the servo reflected light beam LSR in the above-described embodiment, the present invention is by no means limited thereto. For example, the optical disc apparatus 10 may alternatively be so adapted as to operate only for focus control of the objective lens 18 according to the outcome of receiving the servo reflected light beam LSR and employ some other technique for tracking control. With such an arrangement, the optical disc apparatus 10 may be selectively combined with the function of part of a conventional optical disc apparatus 1 (FIG. 1) such that it is adapted to receive the reflected light beam L2R produced as the light beam L1 irradiated onto a servo layer 2B (or a servo layer 104) and operate for tracking control according to the outcome of receiving the light beam.

While the mark layer Y located next to the target mark layer YT and closer to the surface 100A is selected as reference mark layer YS depending on the optical path of the information light beam LM and that of the servo light beam LS formed by the optical path forming section 40 in the above-described embodiment, the present invention is by no means limited thereto and any arbitrarily selected mark layer Y that is already formed such as the mark layer Y separated from the target mark layer YT by an arbitrarily selected number of layers may alternatively be selected as reference mark layer YS by appropriately defining the optical design of the optical path forming section 40. Still alternatively, the mark layer Y located closer not to the surface 100A but to the opposite surface 100B may be selected as reference mark layer YS. With such an arrangement, a mark layer Y located at the side where the servo layer 104 is arranged in the recording layer 101 is desirably selected as reference mark layer YS.

While the track located inside relative to the target track TT and separated from the target track TT by the width of two tracks in the reference mark layer YS is selected as reference track TS and the focus FS and the focus FM are separated from each other by the width of two tracks in the above-described embodiment, the present invention is by no means limited thereto. For example, the track located inside relative to the target track TT and separated from the target track TT by the width of an arbitrarily selected number of tracks may alternatively be selected as reference track TS. Still alternatively, if the light beams are prevented from interfering with each other, the track in the reference mark layer YS that corresponds to the target track TT may be selected as reference track TS. Still alternatively, when information is recorded and reproduced from the outer peripheral side of the optical disc, a track in the reference mark layer YS located at the outer peripheral side relative to the target track TT may be selected as reference track TS.

While a substrate 102 is arranged only at the side 100A of the optical disc 100 in the above-described embodiment, the present invention is by no means limited thereto and another substrate 102 may additionally be arranged at the other side 100B of the optical disc 100. With such an arrangement, the substrate at the other side 100B desirably transmits the information light beam LM and the servo light beam LS at a high transmissivity. When a desired level of strength can be provided only by the recording layer 101, the substrate 102 of the optical disc 100 may be omitted.

While only a single servo layer 104 is provided on the optical disc 100 in the above-described embodiment, the present invention is by no means limited thereto and two or more than two servo layers 104 may alternatively be provided on the optical disc 100. The servo layer or layers 104 may be arranged at the side of the recording layer 101 closest to the surface 100B or at an arbitrarily selected position or positions in the recording layer 101. Then, when the optical disc apparatus 10 forms mark layers Y in the recording layer 101, the optical disc apparatus 10 may form them sequentially on the closest available servo layer 104.

While the servo light beams LS1 through LS5 are produced by diffracting the servo light beam LS by means of the hologram plate 23 in the above-described embodiment, the present invention is by no means limited thereto and the servo light beam LS may alternatively be divided by means of any of various other optical elements or five independent servo light beams LS1 through LS5 may be emitted from five light sources.

While the servo light beam LS is split into five servo light beams LS1 through LS5 in the above-described embodiment, the present invention is by no means limited thereto and the servo light beam LS may alternatively be split into three light beams or into seven or more than seven light beams. If such is the case, the focus error signal, the tracking error signal and the RF signal may be computationally determined according to the detection signal U generated by the photodetector 30. Any of various methods other than the astigmatism method and the DPP method may be employed for focus control and tracking control.

While the beam splitters 24, 25 and 32 in the optical pickup 17 are adapted to simply transmit and reflect a light beam by a ratio of about 50% in the above-described embodiment, the present invention is by no means limited thereto and each of the beam splitters may be replaced by a combination of a polarization beam splitter and a ½ wave plate or a ¼ wave plate so that each light beam may be transmitted or reflected by utilizing the difference of the directions of polarization of the light beams.

While the optical disc apparatus 10 is formed by using an objective lens 18, an optical path forming section 40, a photodetector 30 that operates as light receiving section, a signal processing section 13 that operates as position control section, a drive control section 12, a control section 11 and a biaxial actuator 19 in the above-described embodiment, the present invention is by no means limited thereto and the optical disc apparatus may alternatively be formed by using an objective lens, an optical path forming section, a light receiving section and a position control section having respective configurations that are different from above.

The present invention can find applications in optical disc apparatus for recording information such as images, sounds and/or data to be used by computers on an optical disc and reproducing any of the recorded information from the optical disc.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus comprising:
   an objective lens that converges an information light beam for recording information on or reproducing information from, a single uniform recording layer, of an optical disc, in which two or more mark layers are to be formed one on the other with a plurality of recording marks representing information and arranged in a planar arrangement and also a servo light beam for determining the position of irradiation of the information light beam;
   an optical path forming section that forms the optical path of the information light beam and that of the servo light beam entering the objective lens so as to separate the focus of the servo light beam produced by the objective lens from the focus of the information light beam also produced by the objective lens by a predetermined distance in the layering direction with regard to the direction of the optical axis of the information light beam;

a light receiving section that receives the servo reflected light beam produced as the servo light beam is reflected by the optical disc; and a position control section that controls the position of the objective lens, so as to focus the servo light beam on a formed mark layer, according to the outcome of receiving the servo reflected light beam, wherein the position control section controls the position of the objective lens according to the outcome of receiving the servo reflected light beam so as to make the focus of the servo light beam agree with a desired track formed by recorded recording marks on the mark layer.

2. The apparatus according to claim 1, wherein the optical path forming section positions the focus of the servo light beam at a position separated by a predetermined radial distance from the focus of the information light beam with regard to a radial direction of the optical disc.

3. The apparatus according to claim 2, further comprising:

a spectroscope that divides the servo light beam into a plurality of servo light beams and differentiates the positions of the focuses of the plurality of servo light beams formed by the objective lens from each other with regard to the direction of the optical axis of the information light beam; and the light receiving section being adapted to receive a plurality of servo reflected light beams produced from the plurality of servo light beams as they are reflected by the optical disc and generate light receiving signals according to the respective outcomes of receiving the plurality of servo reflected light beams;

the position control section being adapted to control the position of the objective lens with regard to the direction of the optical axis of the information light beam according to the differences of the amplitudes of the plurality of light receiving signals.

4. The apparatus according to claim 3, wherein the spectroscope is formed by a diffraction grating, and the servo light beam is formed by diffracted light of the second or a higher order produced by the diffraction grating.

5. The apparatus according to claim 1, wherein, when the position control section makes the focus of the information light beam agree with the first mark layer in the optical disc, the position control section makes the focus of the servo light beam agree with a predetermined servo layer prearranged in the optical disc to determine the recording position in the mark layer.

6. A position control method comprising:

an entering step of entering an information light beam for recording information on, or reproducing information from, a single uniform recording layer, of an optical disc, in which two or more mark layers are to be formed one on the other with a plurality of recording marks representing information and arranged in a planar arrangement and also a servo light beam for determining the position of irradiation of the information light beam into an objective lens so as to separate the focus of the servo light beam to be converged by the objective lens from the focus of the information light beam also to be converged by the objective lens by a predetermined distance in the layering direction with regard to the direction of the optical axis of the information light beam;

a converging step for converging the information light beam and the servo light beam by means of the objective lens;

a light receiving step of receiving the servo reflected light beam produced as the servo light beam is reflected by the optical disc; and a position control step of controlling the position of the objective lens, so as to focus the servo light beam on a formed mark layer and to make the focus of the servo light beam agree with a desired track formed by recorded recording marks on the mark layer, according to the outcome of receiving the servo reflected light beam.

7. An optical pickup comprising:

an objective lens that converges an information light beam for recording information on or reproducing information from, a single uniform recording layer, of an optical disc, in which two or more mark layers are to be formed one on the other with a plurality of recording marks representing information and arranged in a planar arrangement and also a servo light beam for determining the position of irradiation of the information light beam;

an optical path forming section that forms the optical path of the information light beam and that of the servo light beam entering the objective lens so as to separate the focus of the servo light beam produced by the objective lens from the focus of the information light beam also produced by the objective lens by a predetermined distance in the layering direction with regard to the direction of the optical axis of the information light beam; and a light receiving section that receives the servo reflected light beam produced as the servo light beam is reflected by the optical disc and causes a predetermined position control section to control the position of the objective lens, so as to focus the servo light beam on a formed mark layer and to make the focus of the servo light beam agree with a desired track formed by recorded recording marks on the mark layer, according to the outcome of receiving the servo reflected light beam.

* * * * *